April 28, 1970   F. HOCK ET AL   3,508,834
PHOTOELECTRIC MEASUREMENT SYSTEM COMPRISING MOVABLE GRATING
Filed Feb. 3, 1969   4 Sheets-Sheet 1
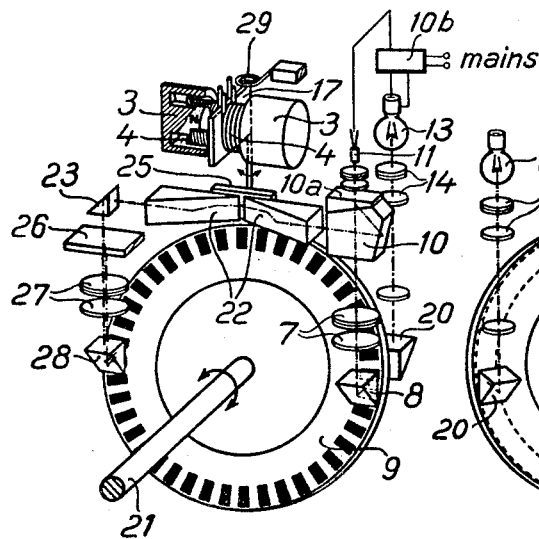
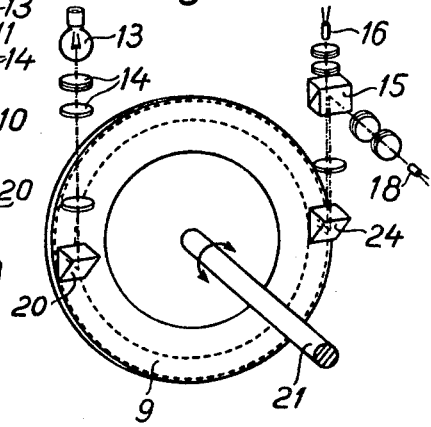
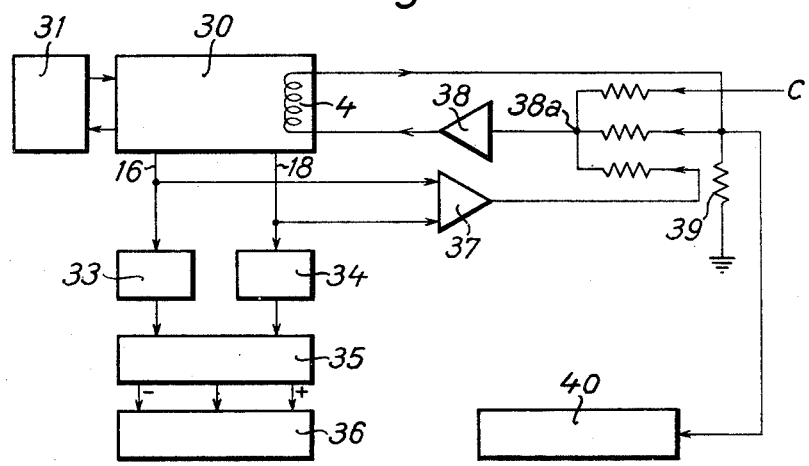
INVENTORS
FROMUND HOCK
KNUT HEITMANN
BY Krafft & Wells
ATTORNEYS

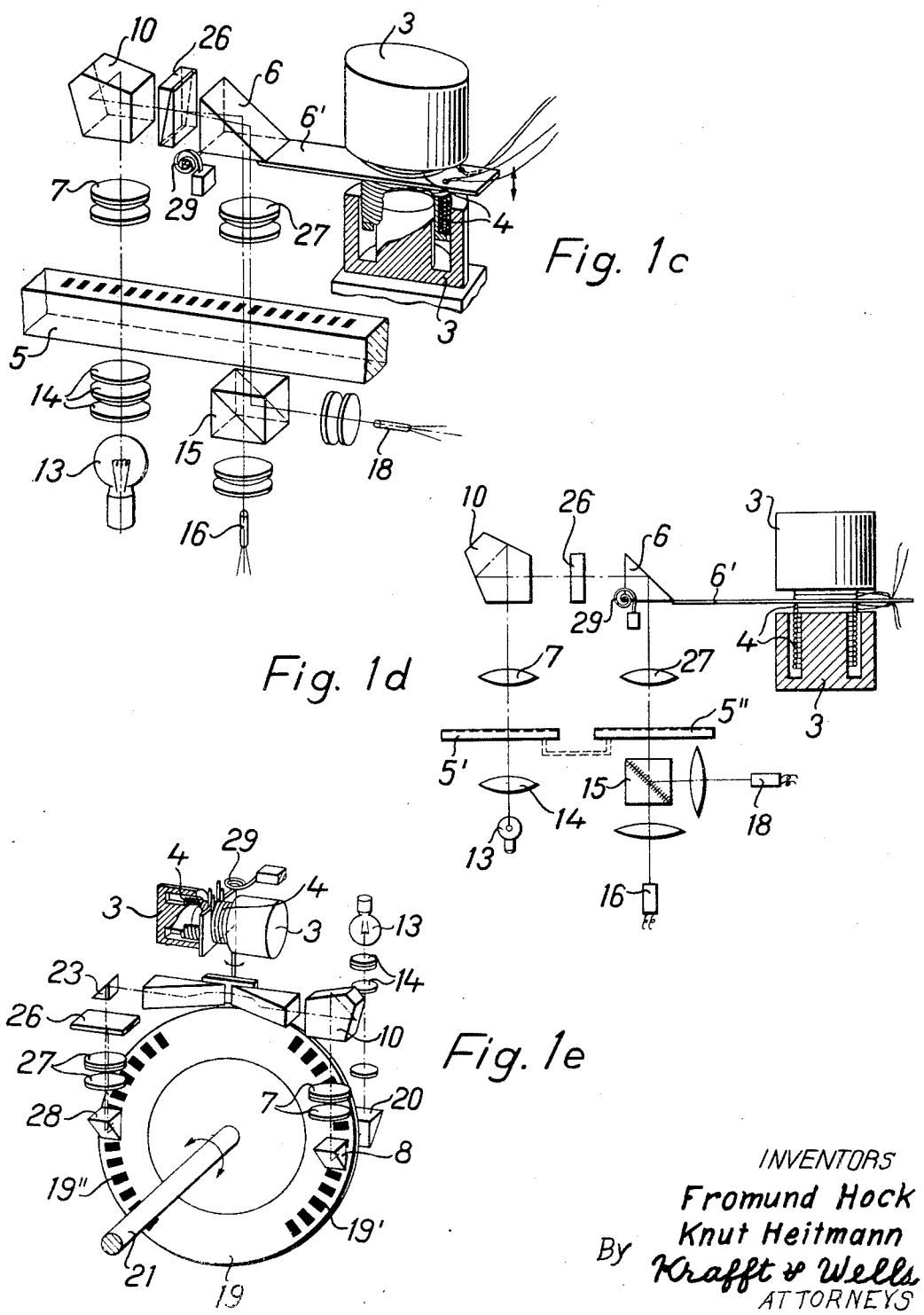

INVENTORS
FROMUND HOCK
KNUT HEITMANN
BY Krafft & Wells
ATTORNEYS

United States Patent Office 3,508,834
Patented Apr. 28, 1970

3,508,834
PHOTOELECTRIC MEASUREMENT SYSTEM COMPRISING MOVABLE GRATING
Fromund Hock and Knut Heitmann, Wetzlar, Germany, assignors to Ernst Leitz GmbH, Wetzlar, Germany
Continuation-in-part of application Ser. No. 653,870, July 17, 1967. This application Feb. 3, 1969, Ser. No. 801,229
Claims priority, application Germany, July 21, 1966, L 54,129
Int. Cl. G01d 5/34
U.S. Cl. 356—152          5 Claims

ABSTRACT OF THE DISCLOSURE

In a photoelectric incremental transducer having a movable grating system of which an image of a grating is projected onto a second grating or onto a different portion of the same grating, means are disclosed for obtaining a precision reading of the measurement result above one full period of the grating. Said means consist of a closed control loop including a displaceable light-reflecting element in the path of the image-forming light rays. The loop is connected to the output terminals of the transducer and—via differential amplifier and a summing-power-amplifier—controls the position of said light-reflecting element in such a way that the transducer whose difference is constantly equal to zero will generate position-defining signals. At the end of the measurement the current need to keep the reflecting element in its particular position will be proportional to the fraction by which the length of the object to be measured exceeds the full period. By means of a special device this current can be converted into digital units.

Further, a positioning device is disclosed which can be pre-set to fractions of one full period.

CROSS REFERENCE TO RELATED APPLICATIONS

Applicants claim priority under 35 U.S.C. 119 for application L 54, 129, filed July 21, 1966 in the Patent Office of the Federal Republic of Germany.

The present application is a continuation-in-part of application Ser. No. 653,870, filed July 17, 1967.

BACKGROUND OF THE INVENTION

Field of the invention

The present invention pertains to photoelectric incremental transducers. Measuring instruments of this kind are characterized in that a light beam is projected through a grating onto a second grating or onto a different portion of the same grating. Photoelectric receivers are disposed behind said second grating or behind said different portion of the only grating. By said receivers pulses or signals are generated when said grating is displaced, said signals being indicative of the extent of the displacement of said grating.

Description of the prior art

Transducers of the above-described nature are well known to those skilled in the art. The gratings employed usually are of very fine graduation. An incremental angle transducer, for example, is known to comprise a circular disc with 6400 division periods on the circumference. Due to the opposite motion of grating and grating image, twelve 800 signal periods per rotation are produced. It is a disadvantage, however, that with the known instruments only full periods can be evaluated during the measurement.

German published specification 1,099,182 of Feb. 9, 1961 discloses in claims 1 and 2 an incremental transducer wherein the dividing lines of a measuring subdivision appear optically doubled by an optical element at the observing station whereby a part of the measuring subdivision has an image of it formed in another place in the same division by optical image doubling.

Reference is further made to U.S. Pat. No. 3,198,061, issued to one party of the present joint inventors. U.S. Patent 3,198,061 gives an example of the prior art measuring heads that are joined to the regulating circuit by which an image of one position of the grating is formed on another grating after doubling of the image.

An object of the invention, therefore, is to provide an incremental transducer by which also fractions of the full period can be obtained in measuring or positioning an object.

SUMMARY OF THE INVENTION

This object of the invention is achieved by introducing a closed loop into the device, which loop comprises a reflecting beam deviating optical element in the path of the light rays that project an image of a portion of the grating onto a different part of the grating or on the second grating. The loops is connected to the output terminals of the photoelectric receivers and has the effect of governing the reflecting element always to a position in which the difference of the generated position-defining signals is zero. This is accomplished by means of a differential amplifier and a summing-power-amplifier. The output current of said amplifier is conducted through the coil of a coil-and-permanent-magnet combination on which the reflecting element is mounted, the displacement of said element being exactly proportional to the current in the coil since the electromagnetic force is compensated by the force of an elastically deformed spring suspended between the movable member and the instrument body.

As will hereinafter be described in more detail from the grating position wherein the difference of the position-defining signals is actually zero, a constantly growing current is needed for adjusting the reflecting element to said "zero simulating position". The amount of said current is indicative of that fraction which exceeds the full period.

DESCRIPTION OF THE DRAWINGS

The invention will be more readily comprehensible from the following explanation when taken in conjunction with the accompanying drawings wherein by way of example a photoelectric incremental angle transducer is illustrated.

FIGS. 1a and 1b are perspective views of the essential parts of the measuring part of an incremental angle transducer with FIG. 1a showing a front view and FIG. 1b showing a rear view of the grating;

FIG. 1c shows schematically the measuring part of an incremental transducer and specifically a linear transducer by which an image of the measuring bar is projected upon itself;

FIG. 1d shows likewise the measuring part of a linear step transducer, but in the latter the image of a subdivision is projected upon a secondary subdivision;

FIG. 1e shows schematically the measuring part of an incremental angle transducer by which the image of a scale is likewise projected upon a second scale;

FIG. 2 is a block diagram of the transducer;

In FIG. 1a the front side of a disc carrying the radial grating 9 is depicted. Said grating is rigidly connected to shaft 21.

Figure 3:
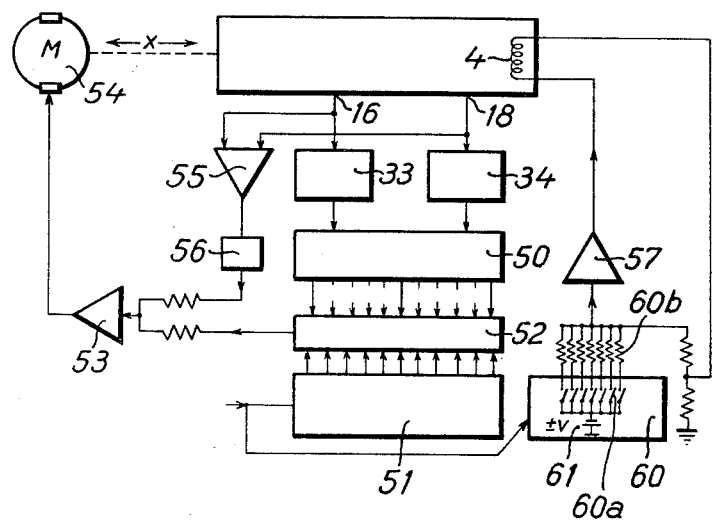
FIG. 3 is a block diagram of a transducer according to the invention used for positioning purposes.

A light source 13 is disposed on one side of said grating. The light beams of said source illuminate a portion of grating 9 by way of a condenser 14 and a reflecting prism 20.

The light beams pass through a grating system consisting of the grating 9 and impinge on a second reflecting prism 8 by which they are reflected to an objective 7, to a pentaprism 10, and to a third reflecting prism 23. By the latter the light beams are further reflected to a beam-doubling and polarizing element, e.g. a Wollaston-prism 26. The resulting beams pass through objective 27, they are then reflected by prism 28 and pass again through grating 9 to prism 24 by which they are reflected to polarizing beam splitting cube 15. Through cube 15 these beams that are polarized in one direction transit to photoelectric receiver 16, whereas the beams polarized in the direction normal to the first polarizing direction are reflected to photoelectric receiver 18.

By the objectives 7 and 27 and by the effect of Wollaston-prism 26, two images of the illuminated portion of grating 9 are projected onto the opposite side of grating 9. The imaging ratio of the objectives 7, 27 being, of course, exactly 1:1.

Pentaprism 10 is provided with an additional prism 10a through which a portion of the light beams emerges to a photoelectric receiver 11. The latter is connected to a control device 10b for stabilizing the output of the lamp 13 by stabilizing the output signal of receiver 11.

Further there are provided two prisms 22 and a pivotable mirror 25 hinged on moving coils 4, which are mounted movably in magnets 3 by a spring 29.

The above-described elements constitute the measuring part of a photoelectric incremental angle transducer of the prior art. Disregarding for the moment the additionally depicted elements, in a photoelectric incremental transducer of the described nature, the receivers 16 and 18 will upon rotation of shaft 21 generate current waves of the type illustrated in FIG. 5, if it is assumed that the images of the grating which are projected back onto the other side of the grating are displaced relative to the solid grating by one quarter period. The signals thus generated can be supplied to a counter or can be evaluated analogously.

In FIG. 1c is illustrated a prior art embodiment of a photoelectric incremental transducer for measuring length. The embodiment includes a linear grating 5 which is imaged on itself and which is in connection with the object to be measured. Grating 5 is illuminated by lamp 13 and condenser 14. After having transmitted grating 5, the imaging bundle of light rays passes through objective 7 and pentaprism 10. Next to prism 10 is arranged a Wollaston-prism 26 which splits the imaging bundle of light rays into two portions, thereby polarizing the portions in different directions. A prism 6 reflects both differently polarized light portions in the direction of grating 5 where each portion forms an image of the grating marks which have been transmitted previously. Grating 5 and the two grating images are sensed by two photoelectric receivers after separation of the two light bundle portions by means of a polarizing beam splitter 15. Prism 6 is resiliently mounted on a spring 29 so that it can be pivoted about an axis extending at right angles to the longitudinal direction of grating 5. To this end, prism 6 is provided with a lever 6', the free end of which carries coils 4 that move in a magnet 3. By supplying current to one of the coils 4, prism 6 can be pivoted, which results in a displacement of the polarized images on grating 5.

FIG. 1d shows an incremental transducer of the prior art which is in all essential parts similar to the one described in connection with FIG. 1c. However, the transducer of FIG. 1d is provided with a grating system consisting of two linear gratings 5' and 5" that are rigidly coupled to one another and which are in connection with the object to be measured. The grating 5' is illuminated by light source 13 and condenser 14, and after beam splitting and polarizing by Wollaston-prism 26, two images of grating 5' are projected on grating 5". The effect of prism 6 and its pivoting arrangement 29, 6', 3, 4 being the same as described above.

In FIG. 1e is illustrated a transducer similar to the one shown in FIG. 1a. However, the transducer of FIG. 1e is provided with a grating system consisting of two radial gratings 19' 19", disposed on a common carrier 19 which is in connection with the object to be measured or to be positioned. The illustrated transducer is an example of an angle measuring transducer wherein an image of one radial grating is projected on a second radial grating (in contradistinction to the embodiment shown in FIG. 1a, wherein an image of a radial grating is projected on itself). The transducer of FIG. 1e can be employed for measuring purposes if only small angles, for example up to 100° or so, are to be measured.

On shaft 21 is mounted the grating carrier 19 provided with the two gratings 19', 19". A light source 13 is disposed on one side of carrier 19 which is a transparent plate. The light beams emitted by source 13 illuminate a portion of grating 19' by way of condenser 14 and a reflecting prism 20.

The light beams pass through the grating 19' and impinge on a second reflecting prism 8 by which they are reflected to an objective 7, to a pentaprism 10, and to a third reflecting prism 23. By the latter the light beams are further reflected to a beam-doubling and polarizing element e.g. a Wollaston-prism 26. The resulting beams pass through objective 27, they are then reflected by prism 28 and pass through grating 19" to prism 24 by which they are reflected to a polarizing beam splitting cube 15 (not shown in FIG. 1e, but shown in FIG. 1b). Through cube 15 these beams that are polarized in one direction transmit to photoelectric receiver 16, whereas the beams polarized in the direction normal to the first polarizing direction are reflected to photoelectric receiver 18.

By the objective 7 and 27, and by the effect of Wollaston-prism 26, two images of the illuminated portion of grating 19' are projected on the second grating 19". The imaging ratio of both objectives 7 and 27 being, of course, exactly 1:1.

In the following figures wherein the invention is disclosed, these measuring parts are symbolized by a block designated 30.

In order to evaluate fractions of the full period a closed control loop is added to the known measuring parts, which closed loop comprises the pivotable mirror 25 or the pivotable prism 6 controlled by a current which is supplied to at least one of the coils 4, a differential amplifier 37 (FIG. 2) connected to the photoelectric receivers 16, 18 of the transducer and a summing-power-amplifier 38 with its input connected to differential amplifier 37 and with its output connected to the coils 4 moving in magnets 3. Between the coils or the mirror 25 or the prism 6 respectively and receivers 16 and 18 the loop is optically closed.

This loop functions as follows: The signals obtained from the receivers 16, 18 (FIG. 2) normally are of the nature depicted in FIG. 5. Said signals are supplied to the differential amplifier 37 and to the summing-power-amplifier 38. The output current of the latter is conducted to the coils 4. Both coils 4 of FIG. 1 are connected in series. The poles of the magnets 3 generate forces in the coils acting in the same direction. In dependence on the direction of the current passing through said two coils, the mirror 25 or the prism 6 respectively is deflected in one direction or the other.

The current of amplifier 38 is conducted to said coils until the difference of the signals received by differential amplifier 37 is negligibly near to zero. The feed back system which is necessary in order to achieve stabilization of amplification as well as a summing effect, is obtained by resistor 39 which causes the amplifier to act as a constant current source. Thereby it is also possible to introduce at the summing point 38a of amplifier 38 an additional correction signal C in order to compensate for temperature, errors in the grating etc. If more than one compensation is necessary, a corresponding number of resistors are to be connected to summing point 38a. The current in the amplifier 38 and the coils 4 is independent from the resistance of the loop or other consumers and is strictly proportional to the fractions of periods to be measured as will now be explained.

As has been outlined above, by the magnets 3 the mirror 25 or the prism 6 respectively is constantly pivoted to a position in which the images of grating 9 which are projected onto the opposite side of said grating are displaced relative to said grating by such an amount that the difference of said position-defining signals as are obtained from the receivers 16, 18 will nearly be zero. In terms of FIG. 5, this means that the mirror 25 or the prism 6 respectively is constantly governed to a position in which the signals pass through point A.

Figure 5:
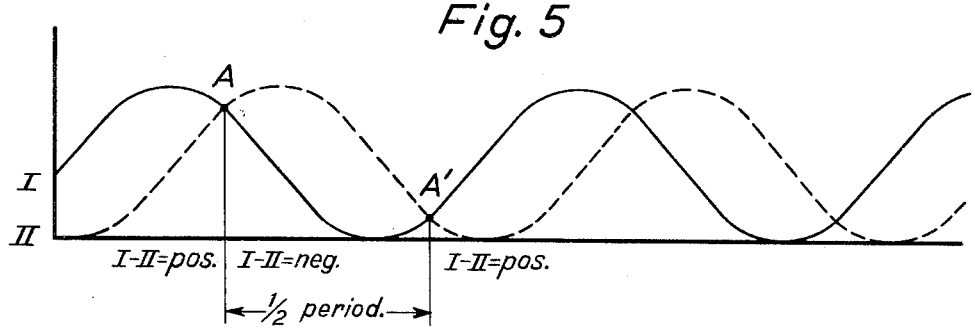
FIG. 5 shows schematically the waves of the two position-defining current signals as obtained in prior art devices.

In the wave diagram of FIG. 5 there are actually two points in which the difference of the signals I and II is zero, i.e. point A and point A'. However, the polarity of both points is reverse. If, for example, the difference I–II is formed on the left hand side of point A, this difference will be positive, whereas it will be negative on the right hand side of point A. With point A' the positive and the negative result will be on reversed sides. This characteristic property is made use of in known manner by the differential amplifier 37 in order to distinguish those two points.

Figure 6A:
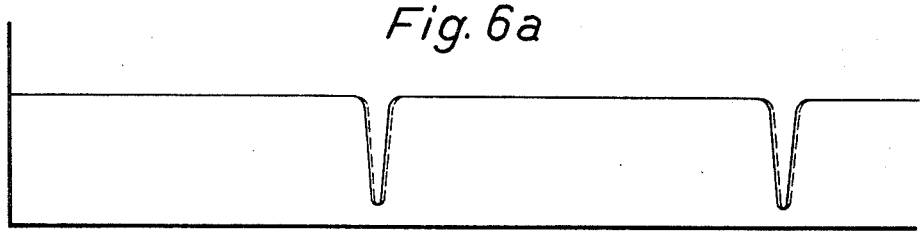
FIGS. 6a and 6b show the waves of the two position-defining signals as obtained when the means of this invention are employed.

Let it now be assumed that the transducer is connected to the main terminals 31. This will cause the mirror 25 or the prism 6 respectively to pivot to a position wherein the signals correspond to point A. If now grating 9 is slowly turned, the mirror 25 or the prism 6 will slowly be pivoted, thereby constantly keeping the difference of said signals zero (FIG. 6a). This will continue until the polarity of the signal difference changes, i.e. until point A' is reached, at which point mirror 25 or prism 6 jumps back to its original position. This back jumping occurs instantly and causes a sharp decline and rise of both current waves, as illustrated in FIG. 6a. By said current rise the up-down counter 36 for the full signal periods is actuated. The counter 36 being connected to said receivers 16, 18 via a direction discriminator 35 and square shapers 33, 34.

Figure 6B:
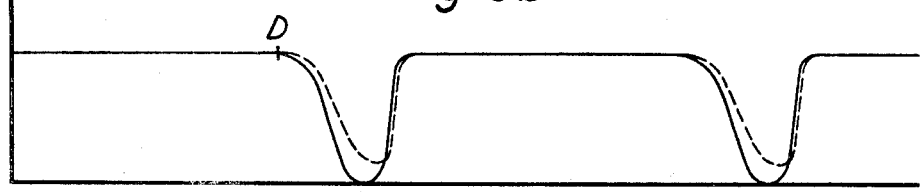

FIG. 6a shows the current waves of both signals if the motion of mirror 25 or prism 6 respectively is unlimited. Since, however, an abutment (not shown) is usually provided on either side which limits the pivoting motion of the mirror, the actual current waves will be of a shape as depicted in FIG. 6b. Point D symbolizes the moment in which mirror 25 or prism 6 encounters an abutment and therefore cannot be pivoted any further. The signal difference therefore cannot longer be controlled to equal zero, which results in both signals declining in the illustrated way until again point A' is reached and the changing polarity of the signal difference causes mirror 25 or prism 6 to jump back, thereby causing a sharp current rise with the actuation of the full period counter 36 resulting.

Two consequences will thus be readily comprehended. The beginning of the measurement is of no practical significance. The first full period will be counted after displacement of the grating by one half period which is a quantity inherent in the apparatus and therefore can be readily taken into account. Second, at the end of the measurement, the current needed to control mirror 25 or prism 6 continuously to a position which results in a signal difference equaling zero is exactly proportional to to the fraction of the period which exceeds the last full period, including the correction signals. In known manner, this current may be used for analogous evaluation or for digital indication by stage 40.

Figure 4:
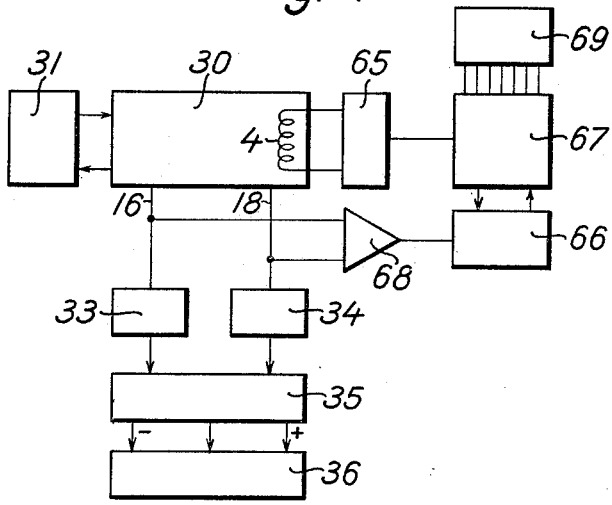
FIG. 4 is a block diagram of a device according to the invention for digitally indicating the result of the measurement, including the fractions of the full period.

If digital indication is required, a device may be used as is schematically illustrated in FIG. 4. In the closed loop controlling mirror 25 or prism 6 a current stabilizer 65 is employed to which via a programmer 66 a step switch or counting mechanism 67 is connected which may be of the electromagnetic or electronic type. The output signals of the photoelectric receivers 16, 18 are conducted to a differential amplifier 68, the output signals of which control programmer 66. Between the elements 4 and 16, 18 the loop is optically closed.

A signal obtained from the output of differential amplifier 68 is supplied to programmer 66 where the sign of the correction which has to take place is decided. The step switch or counting mechanism 67 is then set to half its maximum current and this current is conducted via stabilizer 65 to the coils 4. All subsequent signals are treated in the same way with the exception that mechanism 67 is now set to one quarter, one fourth, one eighth, etc. of its maximum current. This procedure is continued until the signal falls below a preestablished threshold value. The fraction of the full period may now be read from the counter 69 which is connected to this device. The step switch or counting mechanism 67 is known in tht art as a "digital current compensator".

In FIG. 3, a device for positioning an object to fractions of one full period is schematically illustrated. The signals obtained from the receivers 16, 18 are supplied to two square shapers 33, 34 which control an up-down counter 50. By setting of this counter is compared with the setting of a, for example manually settable, reference input stage 51 by means of a comparison stage 52. Stage 52 comprises an analogous output by which, via an amplifier 53, a motor 54 is energized. Motor 54 displaces the object (not shown) coupled to the transducer until the actual value equals the pre-set value.

Besides, the ouput signals from the receivers 16, 18 are supplied to a differential amplifier 55, the output of which being connectable to the input of amplifier 53 via a blocking stage 56. The latter blocks the output of amplifier 55 until the output signal of comparison stage 52 has become zero. Only then the connection of the amplifiers 55 and 53 is cleared. This serves to ensure that first a coarse positioning will take place followed by the fine positioning.

For setting the fine reference value, i.e. the required fraction of the full period to which the object is to be positioned, a setting device 60 is provided. In the illustrated embodiment, this setting device 60 consists of a D-C current source 61 to which parallel contacts 60a are connected. Said contacts 60a being in turn connected to the summing point of the design via resistors 60b. The summing point is also the input of an additive amplifier 57. The output current of said amplifier is conducted to the coils 4 of the transducer. By closing one or more of the contacts 60a, the reference input for the fraction of one full period may be adjusted to a desired value within said full period. Since the coils 4 influence the path of the light beams within the transducer in the aforedescribed manner, it is ensured that also this fraction of one full period is included in the positioning.

In the illustrated embodiment, the actual positioning is performed only by motor 54. However, it is also possible to have separate control circuits for coarse and fine control, each actuating a separate setting element. The latter will then successively adjust the object to its desired position.

What we claim is:

1. A photoelectric incremental transducer including a movable grating system (5; 5', 5"; 9; 19', 19") a light source (13) generating light rays and illuminating a portion of said grating system; optical elements (7, 8, 10, 20, 23, 24, 27, 28) projecting two images of said illuminated portion onto a different portion of said grating system, said optical elements including a beam-doubling and polarizing element (26) and a polarizing beam splitter (15); at least two photoelectric receivers (16, 18) generating position-defining signals corresponding to the relative positions of said grating system; an up-down counter (36) actuated by said position-defining signals; a displaceable light beam deflecting optical element (6; 25) in the path of said light rays, said element being connected to a position-restituting member (29) acting as a spring; electromagnetically operable means (3, 4) introducing mechanical tension into the spring member thereby changing the light beam deflection, a closed control loop of which said displaceable light beam deflecting optical element (6; 25) is a part, said control loop being adapted to displace said element (6; 25) constantly to a position in which the difference of the position-defining signals is negligibly near to zero, thereby generating a current in said electromagnetically operable means (3, 4) which is exactly proportional to the fraction of the period which exceeds the full period in the position of the grating system; evaluation means (40) adapted to evaluate said current in said electromagnetically operable means (3, 4); said closed control loop comprising a differential amplifier (37) connected to said photoelectric receivers (16, 18); a summing power amplifier (38) connected to the output of said differential amplifier (37); resistors connected to the summing point (38a) of said amplifier (38) and introducing correction signals into the circuit; an electric coil (4) connected to said summing power amplifier (38), said coil being part of said electromagnetically operable means (3, 4).

2. The photoelectric incremental transducer according to claim 1, wherein said evaluation means are adapted to digitally indicating said fraction which exceeds the full period, said means comprising a differential amplifier (68) connected to said photoelectric receivers (16, 18); a programmer (66) connected to said differential amplifier (68); a digital current compensator (67) in line with said programmer (66); a stabilizer (65) connected to said current compensator and to said coil (4); a counter (69) connected to said current compensator (67).

3. A photoelectric incremental transducer including a movable grating system (5; 5', 5''; 9; 19', 19''); a light source (13) generating light rays and illuminating a portion of said grating system; optical elements (7, 8, 10, 20, 23, 24, 27, 28) projecting two images of said illuminated portion onto a different portion of said grating system, said optical elements including a beam-doubling and polarizing element (26) and a polarizing beam splitter (15); at least two photoelectric receivers (16,18) generating position-defining signals corresponding to the relative position of said grating system; an up-down counter (50) actuated by said position-defining signals; a reference input stage (51) adjusting the position of an object to a predetermined value; a comparison stage (52) for comparing the setting of the counter (50) with said predetermined value; an amplifier (53) connected to the output of said comparison stage (52); a motor (54) connected to the output of said amplifier (53); a differential amplifier (55) in connection with said photoelectric receivers (16, 18); a blocking stage (56) between said differential amplifier (55) and said first-mentioned amplifier (53); a displaceable light beam deflecting optical element (6; 25) in the path of said light rays, said element being connected to a position-restituting member (29) acting as a spring, electromagnetically operable means (3, 4) introducing mechanical tension into the spring member thereby changing the light beam deflection, wherein the improvement comprises a closed control loop of which said displaceable light beam deflecting optical element (6; 25) is a part, said control loop being adapted to displace said element (6; 25) constantly to a position in which the difference of the position-defining signals is negligibly near to zero, thereby generating a current in said electromagnetically operable means (3, 4) which is exactly proportional to the fraction of the period which exceeds the full period in the position of the grating system; a setting device (60) for setting the current in said electromagnetically operable means to a predetermined value.

4. A photoelectric incremented transducer according to claim 3, wherein said setting device (60) comprises a D-C current source (61); a plurality of parallel contacts (60a) connected to said D-C current source (61); one resistor (60b) in line with each contact (60a), said resistor (60b) being connected to the summing point of an additive amplifier (57) the output of which being connected to the coil (4) of said electromagnetically operable means (3, 4).

5. A photoelectric incremental transducer comprising; a first movable grating; a light source generating light rays and illuminating a portion of said first grating; optical elements projecting two images of said illuminated portion onto a second movable grating rigidly coupled to said first grating, said optical elements including a beam-doubling and polarizing element and a polarizing beam splitter; at least two photoelectric receivers, generating position-defining signals corresponding to the relative positions of said grating; an up-down counter actuated by said position-defining signals; a displaceable light beam deflecting optical element in the path of said light rays, said element being connected to a position-restituting member acting as a spring; electromagnetically operable means introducing mechanical tension into the spring member thereby changing the light beam deflection, said light beam deflecting optical element being part of a closed control loop adapted to displace said element constantly to a position in which the difference of the position-defining signals is negligibly near to zero, thereby generating a current in said electromagnetically operable means which is exactly proportional to the fraction of the period which exceeds the full period in the positions of the gratings; evaluation means adapted to evaluate said current in said electromagnetically operable means; and said closed control loop comprising a differential amplifier connected to said photoelectric receivers; a summing power amplifier connected to the output of said differential amplifier; resistors connected to the summing point of said amplifier and introducing correction signals into the circuit; an electric coil being connected to said summing power amplifier, said coil being part of said electromagnetically operable means.

References Cited

UNITED STATES PATENTS

| | | | |
|---|---|---|---|
| 3,114,842 | 12/1963 | Davidson | 250—220 X |
| 3,116,886 | 1/1964 | Kuehne | 250—231 X |
| 3,391,283 | 7/1968 | Kuhne | 250—231 X |
| 3,421,011 | 1/1969 | Hock | 250—231 |

ROBERT SEGAL, Primary Examiner

U.S. Cl. X.R.

250—231; 356—169